(12) United States Patent
Hill (10) Patent No.: US 8,049,616 B2
(45) Date of Patent: Nov. 1, 2011

(54) METHOD AND APPARATUS FOR DESTINATION TRACKING WITH MISROUTING INDICATION

(75) Inventor: Patricia Hill, Vernon Hills, IL (US)

(73) Assignee: Patricia Hill, Vernon Hills, IL (US)

( * ) Notice: Subject to any disclaimer, the term of this patent is extended or adjusted under 35 U.S.C. 154(b) by 559 days.

(21) Appl. No.: 11/607,399

(22) Filed: Nov. 30, 2006

(65) Prior Publication Data

US 2008/0129488 A1 Jun. 5, 2008

(51) Int. Cl.
*G08B 1/08* (2006.01)
(52) U.S. Cl. .............. 340/539.13; 340/539.1; 340/572.1
(58) Field of Classification Search ............ 340/539.13, 340/539.1, 572.1, 572.9
See application file for complete search history.

(56) References Cited

U.S. PATENT DOCUMENTS

| | | | |
|---|---|---|---|
| 6,552,661 B1 * | 4/2003 | Lastinger et al. .......... | 340/572.1 |
| 6,842,121 B1 | 1/2005 | Tuttle | |
| 6,847,892 B2 * | 1/2005 | Zhou et al. ................... | 701/213 |
| 6,909,356 B2 | 6/2005 | Brown et al. | |
| 6,975,221 B2 | 12/2005 | Monck | |
| 6,975,222 B2 | 12/2005 | Krishan et al. | |
| 6,975,229 B2 | 12/2005 | Carrender | |
| 6,992,584 B2 * | 1/2006 | Dooley et al. ................. | 340/540 |
| 6,992,952 B2 | 1/2006 | Endo et al. | |
| 6,995,655 B2 | 2/2006 | Ertin et al. | |
| 7,002,474 B2 | 2/2006 | De Souza et al. | |
| 7,003,374 B2 | 2/2006 | Olin et al. | |
| 7,243,845 B2 * | 7/2007 | Cash et al. ..................... | 235/384 |
| 2005/0222933 A1 * | 10/2005 | Wesby ............................ | 705/36 |
| 2006/0097046 A1 * | 5/2006 | Fassio et al. .................. | 235/385 |
| 2007/0296581 A1 * | 12/2007 | Schnee et al. ............. | 340/572.1 |
| 2008/0074265 A1 * | 3/2008 | Schoen et al. ............. | 340/572.1 |

OTHER PUBLICATIONS

"At Delta, tracking bags with radio tags", by Ron Coates, C/Net News.Com, http://www.news.com, dated Jul. 1, 2004.
"Oracle helps airport track baggage" by Robert Westervelt, News Writer, SearchOracle.com, dated Dec. 13, 2004.
"A Tough Sell" by Oliver Sutton, Air Transport World, dated Jun. 2005.
"The Ifie and times of an RFID chip," Sandra Gittlen, Network World, Aug. 1, 2005.
"Hong Kong airport tunes, "$0 million auto ID project to improve baggage handling and security, by Brian Robinson, dated Aug. 29, 2005.
"Case Study: Northwest Airlines," Lantronix, 2006.
"The TDS TerraGuide Navigation Package," by Dan Hanttula, Smartphone & Pocket PC, Feb./Mar. 2006.

(Continued)

*Primary Examiner* — Jennifer Mehmood
*Assistant Examiner* — Hongmin Fan
(74) *Attorney, Agent, or Firm* — Seyfarth Shaw LLP (57) ABSTRACT

Methods and devices for tracking portable items, such as luggage, are disclosed. The methods and devices determine an actual location of the portable item, compare the actual location with a predetermined expected location of the portable items, and provide an alert if the actual location is outside of a calibrated range of the predetermined expected location. The system includes a device co-located or stowable with the portable item, and systems and applications remote from the device and able to communicate therewith to send or receive signals, or both.

21 Claims, 4 Drawing Sheets

OTHER PUBLICATIONS

"World Tracer Profile, Your first-choice aprtner delivering quality bagage and cargo solutions, worldwide", SITA WorldTracer Services, dated Mar. 5, 2006.

"How Does GPS Work?" Go Gadgets (the way it works), Continental.Com/Magazine dated Aug. 2006.

"CoPilot Live Pocket PC" overview, http://www.alk.com/copilot/pocketpe.asp, undated.

"Real Time Locating Systems (RTLS)", Association for Automatic Identification and Mobility, undated.

"HP iPAZ hw6500 Mobile Messenger" undated.

* cited by examiner

METHOD AND APPARATUS FOR DESTINATION TRACKING WITH MISROUTING INDICATION

FIELD OF THE INVENTION

The invention relates to tracking and locating stowed air cargo and checked luggage or baggage of airflight passengers and, in particular, to methods and devices for tracking and locating cargo or baggage to ensure arrival at a proper destination and/or location of misrouted items.

BACKGROUND

It has been reported that over 3.5 million claims for missing luggage were filed with major United States airlines in 2005 alone. Though this number is relatively small as a percentage when the total number of passengers in the U.S. is considered, the cost to the airline industry has been estimated to be approximately $1.6 billion, due to payments made for items that are never reunited with owners and the efforts made to find and return misrouted items to their rightful owners.

Misrouted luggage creates problems beyond the monetary cost to an airline. Lost luggage may represent the loss of business materials for a business traveler who needs the materials for a meeting at his/her destination. For recreational travelers, this can mean disappointing vacations or lost gifts and souvenirs. Regardless of apologies and acceptance of blame, an airline simply cannot turn the clock back so that a vacationer has their camera during the vacation, so vacation pictures that were in the lost luggage are not gone forever, and so that the business traveler can still make a positive 'first impression.' In 2005, one major airline lost/misrouted approximately 1% of all passenger checked items. There is no better way for a business to lose customers than to provide inadequate service, particularly when that service is far below competitors. In other words, losing and misrouting of items generates considerable ill will for the air carrier, and the industry in general, damaging the carrier's reputation and making it difficult to retain existing customers or gain new passengers.

Another major issue with misrouted or lost items relates to the United States federal government directive on Positive Passenger Bag Match (PPBM), part of the 2001 Aviation and Transportation Security Act. In short, the directive requires that any checked item on an airline must be matched with a passenger that actually boards the plane. In recent past, Southwest Airlines (SWA) handed out generic plastic numbered boarding cards to people in the order that they arrived at the gate. However, when a particular number failed to board the plane, airline personnel would have to identify the number missing, match that number to a passenger, identify if any bags were checked, and remove those bags from the plane's cargo holds. This required SWA to modify their check-in procedures. For every airline, items that are stowed and need to be removed causes logistical problems in finding the bag, and then removing it. On average, delays have been reported as being approximately 7 minutes, a considerable delay in light of the volume of planes that are being sent in a given day from a single terminal at a major airport.

The PPBM, however, is overall a benefit to lives and to the industry in battling potential terrorist attacks. El Al airlines reported identifying a piece of luggage having an explosive device where the explosives were approximately the thickness of a sheet of wax paper. Had the device exploded with the plane in mid-flight, numerous lives would have been lost. The financial impact would have included the cost of the plane, with a new Boeing 747-400 series plane costing approximately $211 million, and the litigation costs and insurance costs for all the passengers.

The U.S. domestic airline industry has seen significant financial pressures even as passenger bookings have increased geometrically. Numerous airlines are in or have recently been in bankruptcy reorganization. The airlines have attempted to reduce costs in a number of manners, including staff reductions and increased efficiency through various procedures, including boarding. Staff reductions may be one of the causes of misrouted items, and misrouted items decrease airline efficiency. Building in overhead expenses for dealing with misrouted items after the fact, which for one major airline alone has been estimated at $100 million, is difficult for airlines that are losing money.

Airlines have responded to these problems in a number of manners. One approach has been not to treat the disease by preventing lost luggage, instead to treat the symptom by lessening the cost of reuniting customers with lost items. For instance, the World Tracer System has a computer-based customer service application that allows persons to log-in through the internet and input lost item information so that the bag can be located and retrieved. However, this requires people to retain and utilize the claim stubs provided when they checked their baggage, and requires people who may be far from home finding an internet access point. Furthermore, this does little to alleviate the burden of costs for airline personnel physically locating the items, rerouting the items to the proper destination, and then delivering the items by land vehicle.

Some approaches do attempt to treat the disease by working to reduce the incidence of misrouted items. While airlines once simply placed numbered tags on an item, the established industry standard for tracking luggage has evolved into the use of bar-coded paper/adhesive tags. Upon presenting bags for checking, a computer terminal connected with the airline's database used by the airline's check-in agent prints out a specified number of the tags in long strips. The agent removes a backing from a pressure-sensitive adhesive portion of the tag, and secures the tag to the item, typically by making a loop through a handle provided on the item. The bar code is unique to that item, and the tag includes the passenger name and destination airport code. The portion removed from the tag is provided to the customer as a claim stub. Between the agent and the plane's cargo hold or bay, the item is sorted and handled by a number of personnel and numerous conveyor belts.

The tag is scanned at various points between the agent and the plane's hold. Many of these scans are automated. That is, a bag may pass along a conveyor belt at high speed and a fixed scanner will read the tag as the item passes. The information received by the scanner is utilized to control chutes and turns along the conveyors so that a single agent's station can deliver checked items to dozens of gates at several terminals distributed around an airport. As one can imagine, such a system is expensive to build, operate, and maintain.

Despite the presence of this system, the above-discussed problems still arise. Should scanners fail to recognize the presence of an item, it will likely arrive at an incorrect destination. Should the scanner improperly read a tag, the item will again arrive at an incorrect destination. As the tag is passive, the system relies entirely on the scanners. However, damage to the paper tag causes faulty reading. Additionally, should the printer that made the tag malfunction, such as printing too slowly, the bars may be widened resulting in an erroneous reading. Similar problems are encountered in scanning and reading devices that attempt to optically recognize characters.

If the tags are not visible to the scanner, such as being underneath the bag or folded over themselves, the tags are of no use to the scanner. Dirt or smudges on the bar code can also hamper or prevent proper reading of the tag. As a result of these factors, the read accuracy of the tags is only approximately to 80% to 90%.

Once the bag is at the gate, a scanner is typically used to read the tag as the item enters the plane, principally to satisfy the federal PPBM. The scanner is either mounted on the conveyor belt leading to the cargo hold or is manually operated by a baggage handler. This is time consuming and, as baggage handlers are understaffed and time-constrained, prone to error.

As noted above, these tags are passive, meaning that they do not actively communicate and report to any other system, instead simply being read by the scanners. This requires the scanners to be placed everywhere the bag is supposed to travel, which produces a static snap shot of where the bag is when it passes a scanner. For predictable yet undesirable events, such as a bag falling off a conveyor, being erroneously removed and placed on an incorrect tug tractor by a baggage handler, or arriving at an incorrect gate because the scanners failed to recognize the bag, the tag has no way to alert the system of the undesirable event. The system, thus, relies on correct operation at virtually every turn. Once a bag is lost, there is no mechanism to re-direct the bag until the passenger lands at their destination and complains, or an overworked baggage handler notices the error at a connection airport.

Attempts to address the problems with the passive bar-coded tags, which have to have a line of sight with a scanner, have principally revolved around the use of disposable Radio Frequency Identification (RFID) tags which include an embedded microchip in the form of an integrated circuit and an antenna. There are generally three types of RFID tags, though only one type is used in airports. The first type includes a power source so that the RFID can actively broadcast the information encoded therein. However, these are comparatively elaborate and expensive. The second type includes a small battery used only for powering the antenna for receiving a signal. This also tends to be expensive, and also has a short range. The third, which is the least expensive and is the type used in airport baggage tracking, utilizes an antenna that receives inductive power from a transceiver. As this type of RFID tag passes by the transceiver, the inductive power charges the antenna and the IC chip so that the antenna then transmits the information encoded therein. When ordered in bulk, the cost of these RFID tags currently may be as low as $0.07, though a better estimate is probably approximately $0.24. In any event, the cost is relatively low when considered as a portion of the overall fare paid by an airline traveler. Still, these RFID tags can only communicate over a short distance. The tags have difficulty transmitting through materials so that, should the tag be below the item on the conveyor belt, it may not receive or transmit a signal. While use of these RFIDs can improve read accuracy to over 90% under proper conditions, they are still passive devices. Therefore, they do not help monitor the bags once they have passed from the conveyor systems, such as on a tug tractor for delivery to the plane unless additional transceivers are placed near the airplanes to scan bags as they enter the plane.

The RFID transceivers are entirely different from the bar code readers, resulting in a significant infrastructure capital expenditure on the part of the airports or partnering airlines. New computer terminals and printers are needed at check-in to print the RFID tag within a paper tag that is attached to a checked item. Each RFID must be a unique tag as it is statically preprogrammed, and a passenger is assigned to the RFID. The preprogrammed tags are not reusable so that, over time, costs will be significant. While EEPROM-equipped RFIDs are available, locating these in a paper tag would severely impair long-term survivability for the device, and the labor required to reprogram the RFID would not be justified in comparison to using the cheapest type, discussed above.

The preprogrammed RFID transmits its identifier to the transceiver. As noted, the RFID is assigned to a passenger, but does not carry that information as it is preprogrammed. Accordingly, the transceiver must then broadcast to or communicate with a central database to retrieve information about the bag's destination, and must do so quickly. Therefore, an electronic network is needed for communicating with a central server. While these systems have not extensively been installed, a Wi-Fi network is generally utilized for this data transmission, which may also include tracking and logging where an item has traveled.

The central database system requires new staff requirements of highly skilled personnel, e.g. database administrators and software programmers, who are generally highly compensated. If the software is maintained by the vendor, the airport may incur licensing costs in addition to the capital expenditures.

While RFID technology holds certain promises, its use has not fulfilled those promises. To date, no airport has successfully implemented an RFID solution. A $125 million Oracle-Delta Airlines project has been cancelled. Several airports, such as Hong Kong international airport (HKG), have started projects; however, these are major implementation projects running over multiple years in order to upgrade the entire airport.

An RFID system purportedly usable for airline baggage is disclosed in U.S. Pat. No. 6,842,121. In contrast to the RFID discussed above, the RFID is encoded with a proper destination before being located on the item. Encoding requires programming the IC chip at the check-in station, which requires additional equipment and is a low-speed process in comparison with having this done during high-speed manufacturing. A transceiver or interrogator is used in the same manner as the bar-code scanners. In any event, these RFIDs are still passive devices.

It should be noted that the RFID devices including a power source have been utilized in a system referred to as a Real Time Locating System (RTLS). This allows communication ranging from 50 to 1000 feet. However, as discussed above, programming of the tag at the check-in is required, and reprogramming of the microchip for reuse is still required, which require connecting the device to hardware and, thus, are labor and time consumptive.

U.S. Pat. No. 6,975,222 describes an asset tracking apparatus utilizing Global Positioning Systems (GPS) to identify and track an item which may be used with checked baggage. The system utilizes, for instance, a personal data assistant-type device equipped with the GPS hardware and an active transceiver. However, other than disclosing a "monitoring station," there is no discussion of how to implement such a system throughout an airport for use by airline personnel, integration between multiple airports, or for effective use by a single passenger for their own travel.

Accordingly, there has been a need for an improved system, method, and device for tracking and routing of airline baggage.

SUMMARY

In accordance with an aspect, a system for tracking a portable item is disclosed including a communications device stowable with the item and capable of wireless communication, a geographic positioning system remotely located from and able to communicate wirelessly with the communications device to determine a physical location of the communications device, and at least one external application able to communicate with the communications device, the system providing a predetermined expected physical location for the communications device at a specified time. The communications device and geographic positioning system may utilize global positioning system satellites. The system may further include an external database, wherein the communications device retrieves location coordinates and corresponding times for the communications device from the external database via one of the external applications.

The system may further include an alert of misrouting when the determined physical location of the communications device is outside of a calibrated range from the predetermined physical location at the specified time. The communications device may alert one of the external applications of misrouting of the communications device when the determined physical location is outside of a calibrated range from the predetermined physical location at the specified time. The specified time may correspond to departure or arrival on a plane, and the physical location is proximate the plane.

The system may further include a call device, wherein the communications device is responsive to the call device by providing an alarm or identification response. The alarm may be selected from illuminated lights, an auditory sound, or a communication response.

In another aspect, a device for tracking a checked item at an airport is disclosed including a memory module, a communications module, a processor module, and an input module, wherein the communications module communicates with a geographic positioning system to receive geographic location information, the processor module interprets the geographic location information to determine an actual geographic position, the communications module communicates with an external application to receive an expected geographic position at a specified time, and the device compares the actual geographic location with the expected geographic position. The communications module may transmit the actual geographic position to the external application. The device may send a misroute message to the external application when the actual geographic position is outside of a calibrated range from the expected geographic position.

In another aspect, a method of operating a system for tracking a portable item is disclosed including providing a communications device with the portable item, routing the communications device and portable item, providing expected geographic location coordinates corresponding to at least one specified time, determining actual geographic location coordinates for the communications device corresponding to the specified time, and providing an alert if the actual geographic location coordinates are not within a calibrated range of the expected geographic location coordinates. The step of providing expected geographic location coordinates may include delivering the expected geographic location coordinates to the communications device. The step of determining actual geographic location coordinates may be performed by the communications device. The method may further include the step of sharing the actual geographic location coordinates between the communications device and a remotely-located system. The method may further include sending a failure alert if any of the steps is not performed.

The method may further include the communications device determining if geographic location signals are sufficient to determine a geographic location are receivable, and providing an alert if said signals are not sufficient to determine a geographic location.

In another aspect, a tracking system for tracking a portable item is disclosed including a communications device securable with the item and capable of at least one-way wireless communication, a set of external applications including one or more external applications, the set of external applications remotely located from the communications device, the communications device and at least one of the external applications being able to communicate wirelessly in at least one direction, a geographic positioning system remotely located from the communications device; wherein the communications device is at least able to receive communications from the geographic positioning system, and the tracking system provides a predetermined expected physical location for the communications device at a specified time, and determines an actual physical location of the communications device. The communications device may receive communications from the geographic positioning system including location information regarding the actual physical location of the communications device, and may process the location information to determine the actual physical location. The communications device may transmit the processed location information to at least one of the external applications, and at least one of the external applications may determine whether the actual physical location is within a calibrated range of the predetermined expected physical location at the specified time.

In another form, the communications device may receive the predetermined expected physical location at a specified time information from one of the external applications, may compare the actual physical location with the predetermined expected physical location at the specified time, and may provide an alert if the actual physical location is not within a calibrated range of the predetermined expected physical location at the specified time. The alert may include a visual, audible, or radio-frequency communication. The alert may include providing an alert to at least one of the external applications.

The communications device may receive communications from the geographic positioning system including location information regarding the actual physical location of the communications device, the communications device may transmit the location information to at least one of the external applications, the at least one of the external applications may process the location information to determine the actual physical location, the at least one of the external applications may determine whether the actual physical location is within a calibrated range of the predetermined expected physical location at the specified time, and at least one of the external applications may provide an alert if the actual physical location is not within the calibrated range. The alert may include notifying supervising personnel, notifying the communications device, or notifying a further external application.

BRIEF DESCRIPTION OF THE DRAWINGS

In the Figures.

DETAILED DESCRIPTION

Figure 1:
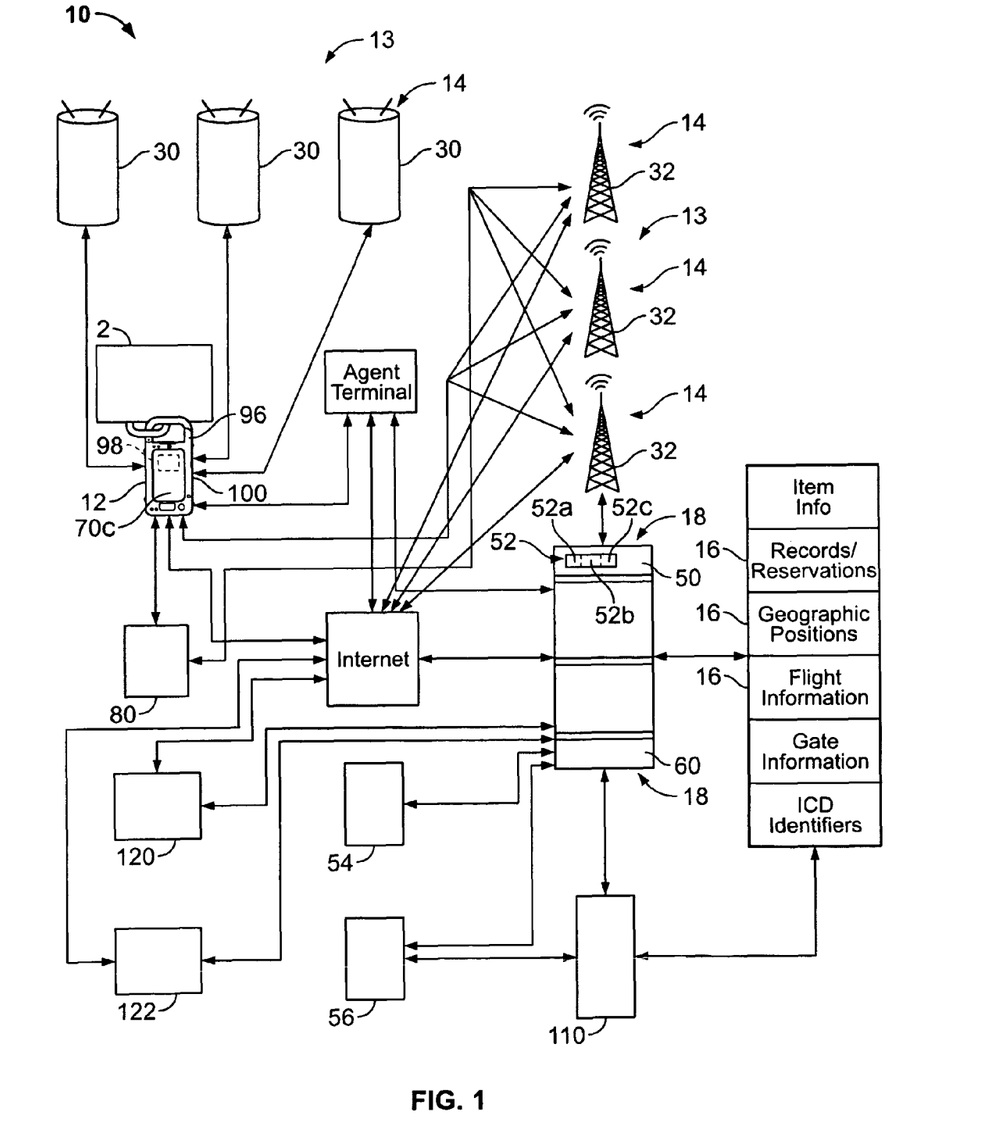
FIG. 1 is a representational view of a system of the present invention for tracking and monitoring the location of an item transported by an airplane.

Referring initially to FIG. 1, an overview of an airport system 10 for tracking and routing items 2 is graphically represented. As used herein, the term "item" refers to any piece that is presented to an airline for stowing in a cargo area of a plane, whether it is luggage, baggage, or another item. While the principal purpose is for the system to be used for checked passenger baggage, the system is equally useful in tracking general airline cargo such as overnight mail or other cargo deliveries.

The system 10 includes an identification and communications device 12 that is attached to and travels with an item 2 that is to be stowed and transported by the airplane. The identification and communications device 12, referred to herein as ICD 12 for the sake of simplicity, is used with a combination of a geographic positioning system 13 composed of a plurality of geographic positioning devices 14, and centralized databases 16, which will be described below. Unless otherwise specified, description of the ICD 12 should be assumed to include the ICD 12 attached to the item 2.

Figure 2:
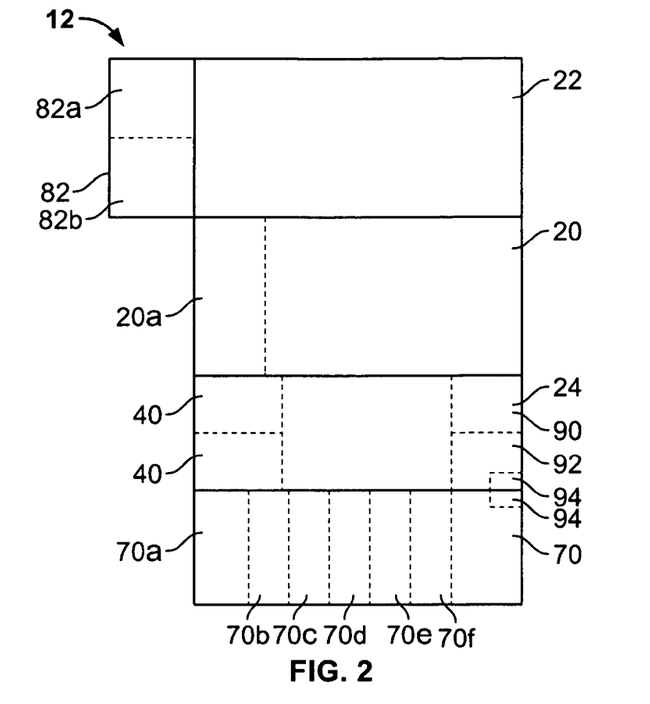
FIG. 2 is a diagrammatic view of components of an identification and communications device of the system of FIG. 1.

The ICD 12, graphically represented in FIG. 2, is preferably a device utilizing a distributed architecture to support specific-purposed applications, discussed below, and components or modules. Minimally, the ICD 12 includes a processor module 20, a memory module 22, and a communications module 24. The functions of the ICD 12 are generally controlled by, and the use of each aspect of the ICD 12 relies on, the processor module 20. Therefore, as the ICD 12 is described herein, it is generally implicit that the processor module 20 is utilized. Furthermore, as it regards input/output of information, it is generally implicit that the memory module 22 is accessed to receive or transmit information, and the communications module 24 performs the tasks of receiving and transmitting information. It should be noted, however, that many, if not the majority, of the memory/information storage functions and/or the processing functions of the ICD 12 as described may alternatively be located/hosted within the external database 16 and/or external application 18. In this manner, the ICD 12 can be commanded by the external application 18, for instance, to display web pages, and the ICD 12 would passively follow instructions, as opposed to the "intelligent" operation described herein. As such, such a form of the ICD 12 may be a simpler, and cheaper device.

The ICD 12 communicates with the geographic positioning devices 14 in order to determine a relatively precise physical location for the ICD 12 and the item 2 to which it is attached. Examples of this method include trilateration and triangulation which typically include sending or receiving signals between the ICD 12 and three positioning devices 14 to determine a relative position by processing the time delays of the signals due to the distances from the positioning devices 14 and the ICD 12. However, other positioning methods may also be incorporated.

The ICD 12 also communicates with the external application 18 in order to receive information and to provide information, discussed in greater detail below. The external application 18 uses the external databases 16 to store information. For instance, the ICD 12 may transmit information received from the positioning devices 14 to an external application 18 for processing, and then receive information in return directing the ICD 12 to perform a function (such as an alarm to alert personnel that the ICD 12 has been misrouted). The ICD 12 may receive information from the centralized databases 16, via cooperation and communication with the external application 18 controlling the centralized databases 16, regarding a passenger itinerary or record, as will be described hereafter.

The system 10 may include a set of satellites, represented in FIG. 1 as 30. The satellites 30 may be the positioning devices 14, may be satellites used for "satellite phone" communications as a relay station to a base station, or both. In forms utilizing the satellites 30 at least in part as positioning devices 14, the satellites 30 may be part of the U.S. government-owned and operated Global Positioning System (GPS). However, use of satellites GPS system typically requires a line of sight to the sky. In the event such is required, the ICD 12 would need to be exposed to the sky.

Either in conjunction with the satellites 30 or as an alternative, the system 10 utilizes wireless (i.e., cellular) communications sites or towers, represented by 32 in FIG. 1. It is known to use triangulation or trilateration methods to provide a geographic location with cellular towers by recognizing time delays from when a transmitted signal from the ICD 12 reaches multiple towers 32. Therefore, the towers 32 may serve as the positioning devices 14. Furthermore, the towers 32 are used to allow the ICD 12 to communicate with the external application 18. It should be noted that an airport could support dedicated communications towers 32 simply for the purpose of supporting a plurality of ICDs 12, or the towers 32 may be those owned and operated by major cellular communications services. The towers 32 and ICD 12 may communicate via conventional cellular methodologies and frequencies (such as CDMA, TDMA, etc.), Bluetooth protocol, Wi-Fi, or other radio-frequency methods. The communications module 24 of the ICD 12 includes one or more transceivers 40 for wireless communication with the satellites 30 or the towers 32. Additionally, it should be noted that the ICD may simply communicate with wireless internet sites at the airport, such as a Wi-Fi network.

It should be noted that the ICD 12 may include the above-mentioned satellite phone technology and protocols so that it may transmit to a base station in the form of a tower 32 via a satellite 30. This may be necessary or beneficial in countries or locations where cellular service is not as available as in metropolitan areas of the United States.

In short, the system 10 thus allows the ICD 12 to receive information regarding the intended geographic position at a given time for the item 2 to which it is attached, and determine and monitor the geographic position at various times, and to communicate its geographic location (or simply provide an indication of whether its location is correct or not at a given time) externally.

In greater detail, the ICD 12 utilizes a distributed wireless architecture allowing it to communicate with a central computer including or coupling the external application 18 and external database 16 without being hardwired via a physical network. The ICD 12 may be a personal data assistant-like (PDA) device, cell phone-like device, or other a central processing unit driven electronic device with wireless capability. Preferably, the ICD 12 is capable of receiving and interpreting geographic position information from the positioning devices 14, and is capable of transmitting that information to the external application 18. Therefore, the processor module 20 includes a positioning module 20a for interpreting geographic position information received by the communications module 24, and the interpreted information may then be transmitted by the communications module 24.

The features described herein for the ICD 12 may be supported by commercially available devices such as a Pocket PC (with Microsoft Compact Framework architecture), a Palm Pilot (with Palm Operating System, or Palm OS), a cell phone or may be supported by a simpler device designed exclusively for supporting these features. It should be recognized, then, that the ICD 12 is interactive, providing for user input, that the ICD 12 is intelligent so that it is capable of performing functions other than simply broadcasting information provided from a remote source (though it may do so), and that it can be utilized with any architecture embodiment such as client/server or web-based 3-tier architecture.

It is recognized that the ICDs 12 are preferably reusable for many trips and, thus, should be sturdy enough to handle being transported in the fashion known to be used by airports. Known devices of this kind (i.e., PDAs or cell phones) have been "ruggedized" so that they survive extreme abuse, such as being driven over by airport utility vehicles.

The external application 18 may be a variety of modules or applications, the use of which may be initiated by the processor module 20. That is, the processor module 20 directs the communications module 24 to transmit messages to the external application 18. The communications module 24 may be controlled to look for a signal (such as from a satellite 30 or tower 32). Once a communications link is established between the ICD 12 and another device such as a tower 32, the processor module 20 may initiate communications with an external application 18 via a dedicated path (such as a dedicated phone number or secure LAN intranet website) or via an internet connection. The message sent from the ICD 12 may direct an external application 18 to receive or transmit information and/or to establish a link with a second external application 18. For instance, the external application 18 may be directed to access a notification application 50 so that a passenger, for instance, receives notice 52 of the location of the item 2. Examples of this notice 52 may be an electronic mail 52a delivered to an email account 54, and a voicemail 52b or text message 52c delivered to a phone such as a cellular phone 56.

The external application 18 may also be an initiating module or application 60. In order for the ICD 12 to be used, it must be provided with some information regarding the intended path and destination for the item 2. Typically, this involves inputting information into the ICD 12. This information may be performed entirely by the initiating application 60, requiring no interaction from a user other than performing whatever steps are necessary to allow the ICD 12 and the initiating application 60 to communicate. In some forms, this can be initiated by a wireless transmission, by physical connection of the ICD 12 as a peripheral to a host computer terminal (such as a check-in agent's terminal), or by input directly to the ICD 12.

As stated, some information must be provided to the ICD 12. To clarify, a user need not directly provide all required information, instead only providing that which allows the ICD 12 and its processor module 20 to retrieve and store all the required information from an external database 16. By way of example and not limitation, a user may input a passenger's name (or other unique identifier such as a credit card number or frequent flyer number) and a travel date, a reservation number, or directly input flight numbers. Broadly speaking, any information that is sufficiently unique for the initiating application 60 to identify and supply a record of the intended itinerary is sufficient. The ICD 12 and/or the initiating application 60 can then determine the expected geographic positions and corresponding times for the ICD 12.

Unless the initiating application 60 is triggered by a wireless transmission such as a check-in agent's terminal communicating via Bluetooth protocol, the ICD 12 requires an input module 70, which may have input/output capability. The input module 70 may be one or more of a variety of forms including a keyboard/keypad 70a, a hardwire connection 70b (such as a USB port), a graphical user interface (GUI) 70c, a camera 70d, a bar code scanner 70e, the communications module 24, or other input feature.

Each of the forms of the input module 70 allow a user to upload and download information, to direct execution of control processes such as erasing information from a previous use of the ICD 12 or resetting of the ICD 12, to confirm the accuracy of the input information (such as manually inputting information via the GUI 70c and allowing a connection via the hardwire 70b to communicate with the external application 18 to confirm the flights and destination), and to update information (such as when an itinerary changes or a passenger changes airlines during a layover), as a few examples. The ICD 12 uses the uploaded information to determine flight reservation information so that the proper departure and/or arrival gate can be determined, and the proper geographic position for a gate, as well as the times at which the plane should be leaving and arriving. Additionally, the ICD 12 uses the flight reservation information to determine connecting gate and arrival gate positions and times. For a connecting flight, the ICD 12 can automatically connect with the external application 18 to determine if an update is necessary, such as if a plane is diverted, or if a connecting flight is missed or rescheduled. Accordingly, updating (and reprogramming of the device for subsequent uses) may be done wirelessly and automatically, without connection of the ICD 12 to hardware.

In one of the preferred forms, the ICD 12 utilizes the GUI 70c as a touch screen and a stylus in the manner commonly know for PDAs. In one example of operation, a user may touch a reset button on the screen of the GUI 70c, and then enter a reservation number with the stylus. The ICD 12 transmits this information (such as by wireless communications or via the hardwire 70b) to the initiating application 60, which requests travel and destination information from the external database 16. Upon confirmation of identity, the initiating application 60 may then return the geographic position information to the ICD 12. During or after this time, the ICD 12 may be connected or attached to the item 2, and the two may then be sent off for delivery to a plane. In another example, the ICD 12 may be connected to a personal computer of the user (or an airline agent's terminal), and the personal computer or terminal is then used to communicate input information to the ICD 12 (such as may be referred to as synchronization, or in a manner similar to dragging files into a folder for a portable USB plug/drive). In each form, the touch screen provides confirmation requests upon input of information to assure accuracy of the itinerary. A screen may also provide alerts to a user such as low battery or excessive checked baggage, or incorrect information input. Other input components may also be included, such as a camera 70d that allows a picture of the item 2 to be uploaded, or a scanner component 70e. With the scanner component 70e, the ICD 12 may be utilized in conjunction with the current bar code tag system. The agent's terminal may display the bar code, or printout a bar code, and the scanner component 70e may read this information so the ICD 12 may wirelessly communicate with the external application 18 for retrieving the flight information and record. It should be noted that an initial software load, and software upgrades, for the ICD 12 may be necessary, which would preferably be performed utilizing the hardwire connection 70b. It should also be noted that simpler forms of each input components may be provided, such as the GUI 70c being a basic liquid crystal display (LCD) that displays simple messages or codes to the user.

It should also be noted that the ICD 12 may carry a standard connection port (such as a USB or FireWire) for direct connection with another device (such as a personal computer or an airline-supported system) so that information is directly loaded into the ICD 12. In some forms of this embodiment, the ICD 12 may simply communicate with the external application 18 or provide an indication (audible, visual, or both) when misrouting occurs. Thus, a user could utilize their laptop/personal computer, for instance, to input the travel itinerary into the ICD 12. Coupled with a web-based application, the computer may further utilize the user-input information to determine the proper locations/times for the itinerary/routing and send such information to the ICD 12. Alternatively, once the ICD 12 has received the itinerary information from the computer, the ICD 12 may then communicate with a separate computer or external application 18 to determine the locations and times. This may be done by wirelessly communicating with an external application 18 and secure database 16 or by connection with a second computer (such as an airport-based check-in terminal) to provide the itinerary and receive the information.

The input module 70 preferably includes a passive listening input module 70f. The passive module 70f remains generally dormant unless activated by another device. Due to Federal Aviation Administration (FAA) regulations, on-board electronic devices must be switched to a non-transmitting mode during flight. The passive module 70f allows the ICD 12 to switch off its own transmitting systems (portion of the communications module 24) while also allowing the ICD 12 to monitor for signals that indicate arrival at a destination. These can be remotely controlled by an external application 18 that transmits a message via the tower 32 at the appropriate time for the ICD 12 to shut down. However, if the ICD 12 recognizes that it is not on the intended plane (based on its geographic positioning information), it can immediately alert personnel by responding via the communications module 24 to an external application 18 or make a sensory alarm, as will be described below.

In general, the ICD 12 operates as directed by its processor module 20. However, as noted above, there are times when the item 2 may need to be retrieved from a plane's hold because the passenger who checked the item 2 did not make the plane. In order to simplify identification of the item, the system 10 may include a call device 80 (FIG. 1).

The call device 80 transmits a particular signal, preferably via Bluetooth protocol, including information that would be recognized by one ICD 12 to the exclusion of any other ICDs 12 located in close proximity, that activates the passive module 70f. To allow the ICD 12 to respond to the call device 80 in a manner that allows a baggage handler easily and quickly to identify the bag, the ICD 12 is equipped with sensory responders 82. Generally, the most effective sensory responders 82 will be auditory or aural responders 82a (speaker or alarm, or automated voice), visual responders 82b (illuminated lights), or both. The call device may display a map of the ICD 12 location to facilitate identification of item 2. The call device may also display a picture of the item 2 if the camera 70d was used during the check-in process. The speaker or automated voice may broadcast a message that specifically identifies the bag (such as "blue twenty-four inch Samsonite wheeled bag") and the proper destination ("send to gate K12").

In response to a call device 80 and identification by the ICD 12 as being the appropriate unique ICD 12 that is being called, the ICD 12 directs the speaker/alarm 82a and lights 82b to turn on. In the event the item 2 is covered by other items (preventing the light 82b to be seen), the speaker/alarm 82a can guide the baggage handler through the pile of items. However, due to known airport tarmac hearing conditions, the speaker/alarm 82a may be an imperfect solution, one whose effectiveness is bolstered by the lights 82b.

The ICD 12 processor module 20 may also utilize these sensory responders 82 based on its own stored software rules, including providing an alarm/lighting when the ICD 12 realizes it is not in the proper geographic location, either because of time or because it has gone to the wrong gate or terminal (misrouting). The sensory responders 82 may also be used to gain the attention of airport personnel if the ICD 12 is being improperly removed from the airport or baggage carousel. The sensory responders 82 may also alert personnel immediately upon arrival in an unintended destination so that corrective action may be had immediately, instead of waiting for a passenger to complain to the airline that their item 2 did not arrive. This shortens the time for the item 2 to be rerouted and reunited, and expedites the ability of the airline personnel in locating and identifying the misrouted item 2.

As should be recognized, the communications module 24 has multiple components or aspects enabling both short range and long range communications. More specifically, the communications module 24 includes a short range (i.e., Bluetooth or Wi-Fi) enabled module 90, and a long range module 92 for satellite and/or cellular communications. The communications module 24 is equipped for TCP/IP communications and other relevant internet based protocols and coding schemes. The communications module 24 and input module 70 also include one or more antennae 94 for communication with satellites 30 or towers 32. For instance, an antennae 94a may be utilized for one communication method such as Bluetooth protocol, and a second antennae 94b may be utilized for a second communication method such as with a satellite.

Figure 3:
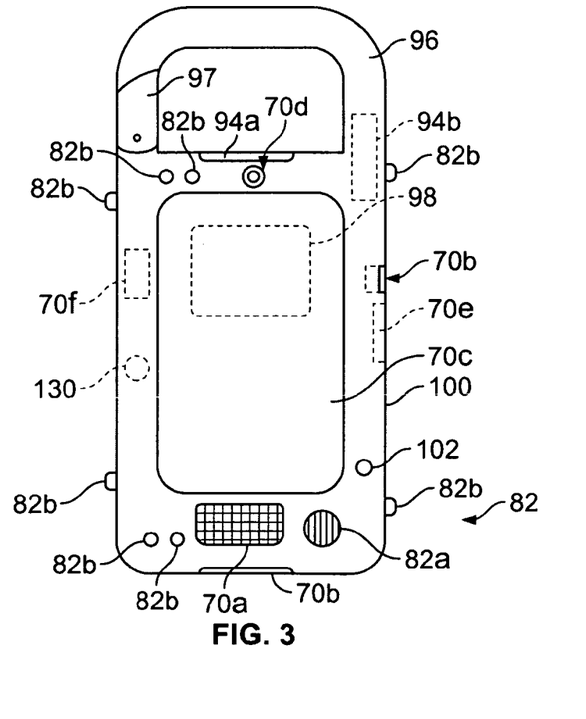
FIG. 3 is an illustrative view of the identification and communications device of FIG. 2.

The ICD 12 further includes an attachment device 96 for securing with the item 2. Preferably, this is a rugged handle 96, as shown in FIG. 3, that includes a carabiner-style spring loaded arm 97. However the ICD 12 could be built into the luggage. The ICD 12 is powered by an internal rechargeable battery 98, which may be removable or may dock with a recharging station (not shown). The ICD 12 should tolerate environmental extremes such as temperature, humidity and moisture, and location specific ambient pressures. A casing 100 for the ICD 12 should tolerate impact and resist entrance of dirt and particulate matter, while the entire ICD 12 should have a minimal weight so that total cargo weight is minimally increased for an aircraft. The casing 100 may be clad in a rubber material, or the like, to assist in impact resistance. The ICD 12 includes an on/off switch 102. Alternatively, the ICD 12 may simply be placed within the luggage item 2 (without a lock for attaching to the luggage), in which case the ICD 12 preferably determines its position using wireless communications systems/protocols as opposed to the satellite trilateration methods with GPS. In another form, the ICD 12 may be built into the item 2 itself. In such an event, each ICD 12 may be provided a specific identification number, and the number may be registered for service (in the same manner as a cellular phone is registered to activate service).

For a variety of reasons, the ICD 12 may not always be able to communicate with a satellite 30 or tower 32. In the event either is available, the ICD 12 may perform a status or health check, as the processor module 20 will direct the communications module 24 to communicate with an external application 18 to indicate continued proper operation of the ICD 12, and may communicate other status information such as arrival at an intermediate stop prior to a final destination (such as transferring of planes by the passenger and ICD 12). Alternatively or in addition, the ICD 12 may simply display a visual indication of its intended destination, such as flashing the flight number and/or destination city on its screen or GUI 70c.

As discussed, the ICD 12 communicates with a variety of external applications 18. These applications 18 may be accessed through a direct (dedicated) connection, which benefits security, or via the internet. In either manner, the external application 18 is typically coupled to the external database or databases 16 so that information can be received and stored in both the database 16 and the ICD memory module 22. In the event the internet is used, additional implementation layers may be added to the operation. In general, the external application(s) 18 and external database(s) 16 can be controlled, maintained, and serviced by a customer service application 110, described in greater detail below. The customer service application 110 and external application(s) 18 may be joined as a single application, or may reside on a variety of host computers or servers as a variety of discrete applications. The customer service application 110 may be hosted at a central site or by a central server system and accessed by persons located at any airport or customer service office in the world. The customer service application 110 allows service personnel to monitor and act in real-time for any operational need.

An example of use of the ICD 12 and system 10 in general is presented. A passenger arrives at the airport with a number of items 2 to be checked. Either at curbside or at ticketing, the passenger presents the items 2 and personal identification. The airline agent checks the personal identification to confirm the passenger's identity, and to locate the passenger reservation. An ICD 12 is selected. The ICD 12 is provided some information so that it may communicate with an external application 18 and external database 16 to retrieve flight gate departure information including geographic location and time, and the same information for arrival gates and any intermediate stops. The information may be provided to the ICD 12 by manually inputting the information, by the agent's terminal inputting the information, or by another component discussed above. The ICD 12 is then attached to the item 2, and together they are routed through the airport's baggage handling system. A timer 130 (FIG. 3) may be utilized from initiation so that, if a signal from a positioning device 14 is not found within a predetermined period of time, the ICD 12 recognizes that it is not being conveyed to the airplane properly, and the sensory responders 82 may be triggered and the communications module 24 may send a notification to the external application 18 and customer service application 110, and/or to the passenger's cell phone 56 or email account 54. The timer 130 may be programmed based an a standardized time (such as an hour), or may be dynamically programmed based on the time of initiation and the expected time of being loaded onto a plane.

While being routed and prior to takeoff, the ICD 12 monitors its geographic location via positioning devices 14 such as satellites 30 or radio towers 32. The ICD 12 can also communicate with receivers 120 that are part of the baggage handling system to provide identification to the receiver 120 for proper routing of the ICD 12 and item 2, or scanners 122 may be provided that rely on conventional bar code technology. Prior to takeoff, the external application 18 may direct the ICD 12, via wireless communication, to end transmissions. In a suitable amount of time for the duration of the flight, the ICD 12 begins to listen for signals directing it to turn on transmission.

If at any point the item 2 is misrouted, the ICD 12 provides a sensory response via the sensory responders 82 of such a fact and can communicate misrouting to the external application 18 so that an expediter or other baggage handling personnel can quickly retrieve and reroute the item 2. Once the plane and ICD 12 arrive at the proper destination (including intermediate stops or layovers, with or without a plane change), the ICD 12 can direct an external application 18 to notify the passenger that the item 2 has arrived properly (or the ICD 12 can communicate directly with the passenger). In any event, the ICD 12 preferably communicates with the external application 18 so that there is a record of its arrival, thereby lowering the incidence of fraudulent claims for lost luggage.

At all times, the customer service application 110 can monitor and perform maintenance or health checks on the ICD 12. The customer service application 110 can also ensure that items 2 are quickly removed from planes should the passenger not board the plane by directing the sensory responders 82 to provide an alarm or misrouting indication. The customer service application 110 can also monitor the ICD 12 to quickly recognize misrouting and take corrective action. The customer service application 110 updates the memory module 22 to reflect changed plans.

Alternatively, the ICD 12 and customer service application 110 (or other application) may simply communicate on an as-needed basis. In other words, the ICD 12 may operate generally independent to monitor its own location, and the ICD 12 may communicate with the external application 18 only when the ICD 12 determines its location is not correct. During this time, the external application 18 would simply passively listen for the ICD 12 (or listen for any of a plurality of ICDs 12). On the same token, the external application 18 may become active if the information carried by the ICD 12 needed to be updated. For instance, if the gate is changed for a flight, if the flight is canceled or delayed, or it is known that the passenger will not be boarding the flight and the ICD 12 and item 2 need to be retrieved, the external application 18 can send information to the ICD 12 so that appropriate action can be taken by the ICD 12.

The customer service application 110 maintains and compiles detailed performance reports. These reports can also be used to reduce or eliminate fraudulent insurance claims for lost luggage as the item 2 can be traced to an airport and removal of the device from the item 2 upon presentation of a claim check can be verified. One possible manner for doing this is to lock the handle 96 via a solenoid or other electrically closed lock (not shown) that releases only upon input of a particular release code provided to the passenger.

Because the ICD 12 is aware of its location, if the ICD 12 arrives in a foreign city where English is not the native language, any information provided in the input/output module can be changed to match the arrival country. In contrast to prior art devices, which at best perform location monitoring with no decision-making regarding such location, embodiments of the present invention allow for destination tracking as the ICD 12 recognizes or is able to determine a present location as well as an intended location and comparing the two. Furthermore, embodiments of the present invention allow for alarms or other indications to either the passenger, the system 10 (and its support personnel), or to proximally located personnel that the ICD 12 and its attached item 2 are not in the intended location.

It should be noted that a simple version of the ICD 12 may be provided where a user inputs a travel plan into the ICD 12. The ICD 12 may then track its own status without the assistance of a remote application or database, though it may be necessary to provide the ICD 12 with initial location information, at which point the ICD 12 may cease to electronically communicate. At such point, the ICD 12 may provide an alarm or indication to, for instance, a proximally-located baggage handler when the ICD 12 and item are misrouted or an in improper location.

In an alternative use of the system 10, the airport can use the system 10 and ICD 12 to determine the proper cargo. For instance, the airline compiles a list of all the items 2 that are to be on board a particular plane. When the items 2 and ICDs 12 are loaded onto a plane, an external application 18 communicates with each of the ICDs 12 to determine their location. Each ICD 12 can respond accordingly. If an item 2 is missing, a baggage handler can be notified to search for it, and/or the ICD 12 attached thereto can be prompted to broadcast an indication (such as an alarm or flashing light). It should also be noted that the ICD 12 can display its intended flight number and destination (or simply the flight's gate number) on its screen so that baggage handlers can confirm that the item 2 should be loaded on a particular flight.

In another form, the ICD 12 may report its location to the external application 18, and the external application 18 may host the major decision-making functions. Accordingly, the external application 18 may direct the ICD 12 to provide its alarms or indications of misrouting, and instructions with which the ICD 12 simply complies.

In another form, the ICD 12 may report its location to the external application 18, which then stores the information in the database 16. To minimize processing power and resources, no further action is taken unless and until an item 2 is determined to be missing. The location information is then retrieved from the database 16 so that the location and/or path of travel can be determined so that the item 2 can be located.

In some forms, the ICD 12 may be provided with multilingual capabilities. For instance, if the destination were Paris, France, the ICD 12 may display information in French to assist baggage handlers. Additionally, the ICD 12 may automatically toggle (or simply permit toggling) between languages so that the Francophone baggage handler may understand any information being provided and also allow the user to be able to view information in their native language. In another manner of dealing with language barrier issues, inter alia, the ICD 12 displays a map on its screen showing the present location and the intended location for the ICD 12 and the item 2. Additionally, if an ICD 12 is lost, the ICD 12 can be queried for its position, and this information may be used by airport personnel to identify the actual location of the ICD 12.

In some forms, the ICD 12 may be utilized in conjunction with the bar-code systems currently installed in airports. In one form, the bar-code scanners may be retrofit with a short-range interrogator so that ICDs 12 passing thereby can be prompted to respond with a message regarding their identity, and thus proper routing can be evaluated. Alternatively, the screen on the ICD 12 can display the bar code for the scanner to read.

As can be appreciated, optimal performance of the system 10 relies on accurate and precise geographic position information supplied to the ICD 12. This relates to two different issues, security, and ownership of the ICD 12.

For security purposes, the FAA or federal governments may not want such precise geographic information, which could be used by terrorists to create highly accurate maps of airports, in the hands of the public. However, all such information could be encrypted and/or used in a parallel 'dummy' form within the ICD 12 so that the ICD 12 is merely looking for raw signal values that it has been instructed to match with downloaded, intended or expected signal values, each of the sets of values being coded. Accordingly, the actual positioning coordinates are not provided. Furthermore, the communications between the ICD 12 and the external application 18 can hide information from a passenger or other person such as what gate the plane should land at, and simply confirm in a 'black-box' manner that everything is correct or something is incorrect. Nonetheless, the ICD 12 (and/or any supporting application or database) may communicate with a web-based page such as a private site that allows a user to monitor the exact position of the ICD 12.

It should also be noted that, should the ICD 12 simply be loaned to the passenger's item 2 during the flight segments, the security risk is greatly diminished. A portion of the memory module 22 that contains the geographic positioning information could be volatile so that, if power is cut to the ICD 12 so that it might be stolen without providing an alert, all information stored therein may be lost and unrecoverable.

The other issue is ownership of the ICD 12. The ICD 12 may be owned and brought along by a person or user (i.e., passenger) that is checking the item 2 in, or it may be loaned for the airborne travel itinerary (and owned by the airline, a consortium of cooperating airlines or airports, an industry group, or governmental agency such as the FAA or Transportation Security Administration (TSA)). Should the ICDs 12 be retained at an airport, when an item 2 is presented for travel, the information (itinerary, item description, etc.) is input into the ICD 12. If the passenger owns the ICD 12, travel identification information may be input into the ICD 12 prior to arrival, so that only synchronization between the ICD 12 and the external application 18 and database 16 is required, shortening the time required for checking in the item 2.

Figure 4:
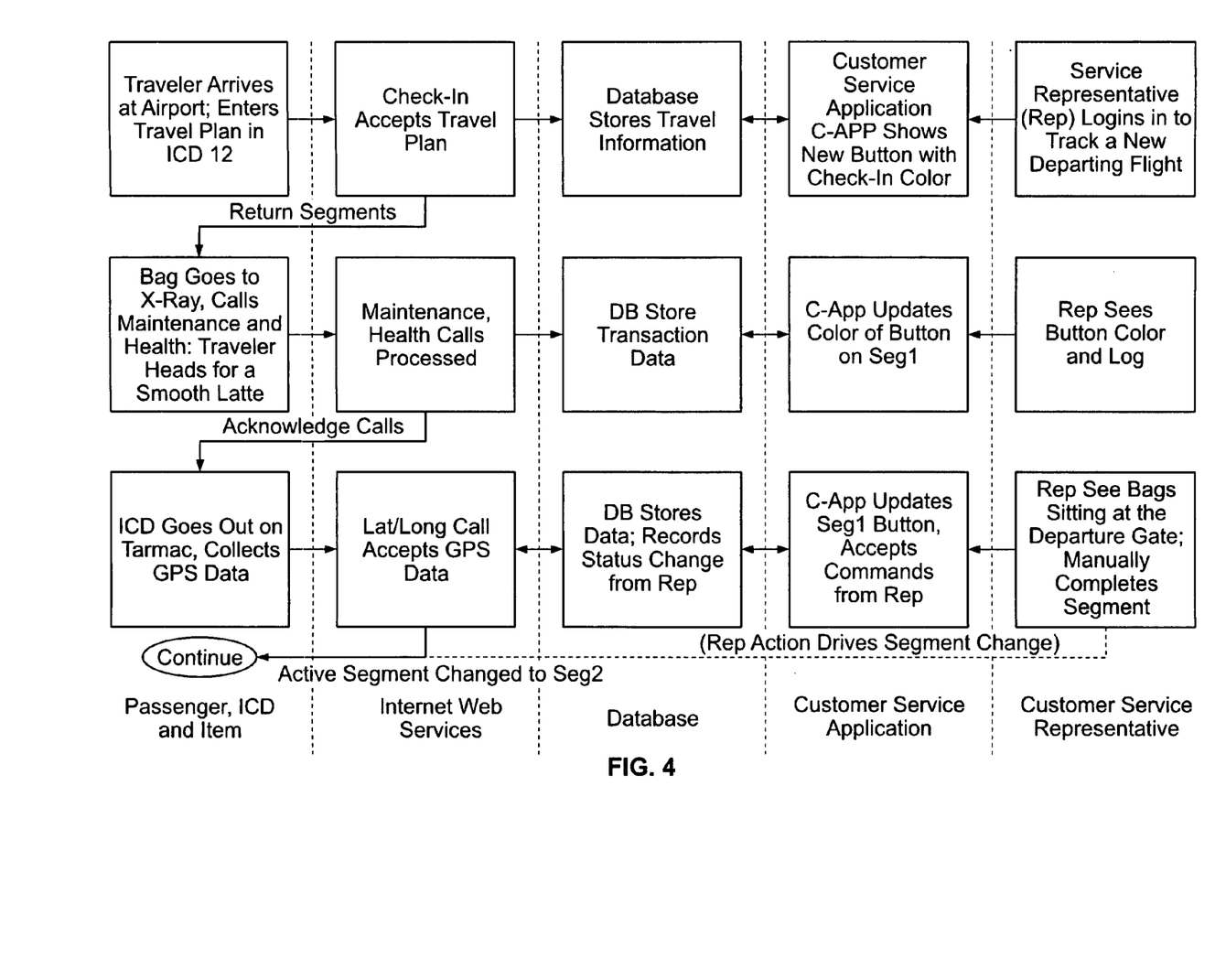
FIG. 4 is a flow diagram showing a first segment of a method performed by the system of FIG. 1 for the identification and communications device being used with an item on at boarding and departure.
Figure 5:
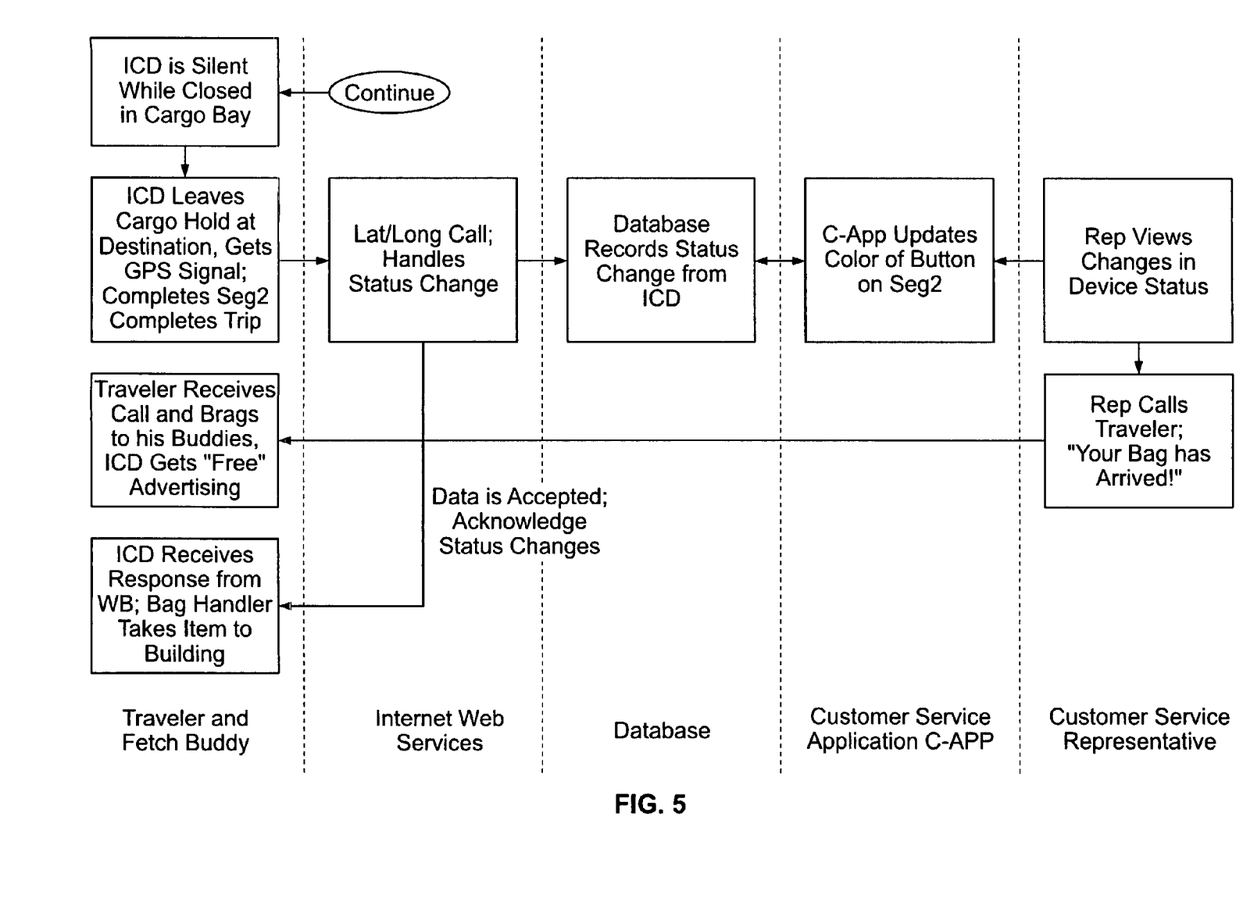
FIG. 5 is a flow diagram showing a final segment after the first segment of FIG. 4 of a method performed by the system of FIG. 1 for the identification and communications device being used with the item at arrival and de-boarding of a plane.

Referring now to FIGS. 4 and 5, operation of the system 10 is shown for departure (Segment 1 or Seg1) and arrival (Segment 2 or Seg2) of a passenger and an item 2 with the ICD 12 attached thereto. As can be seen in FIG. 4, the passenger arrives at the airport with one or more items 2. A travel plan is entered into an ICD 12 for each of the items 2. The items 2 and passenger are checked in, and the travel plan is accepted by a computer system such as internet web services hosted by the an external application 18. Information regarding the passenger, items 2, and ICDs 12 is stored in the databases 16, which triggers a record for the customer service application 110, referred to as C-APP with an indication as to the status. The indication is preferably a color-coded button. A service representative logins into the customer service application 110 to monitor and track the ICD 12 and the departing flight.

Simultaneous to the storage of the database information, etc., the item 2 and ICD 12 are sent to the baggage handling system including security inspection personnel and equipment such as an X-Ray machine. The ICD 12 performs self-diagnostics and checks such as maintenance and health calls, which are processed by the external application 18 hosted as a web services application. Again, this information may be stored in the external databases 16. Once successful in these checks, the customer service application 110 updates the indication by changing the color of the color-coded button. The customer service representative recognizes this color, and the location of the ICD 12 is logged.

As the ICD 12 progresses, it eventually reaches the airport tarmac allowing it to communicate with GPS satellites 30 to determine longitude and latitude (Lat/Long) for its location. The location of the ICD 12 is confirmed against information received by the ICD 12 at check-in or during location-tracking calls, or is simply transmitted back to the web services external application 18 for comparison to database geographic position values, and for confirmation of correct geographic positioning of the ICD 12 and item 2 for stowing in the proper plane. This information is stored in the external databases 60, the customer service application 110 recognizes this information and again updates the color-coded button, and a service representative manually inputs commands to the ICD 12 for shifting to the next segment of travel, such as an intermediate stop for a plane transfer or for a final destination.

Turning now to FIG. 5, the ICD 12 is silent (non-transmitting) during the flight and while stored in the cargo bay, yet is listening for signals indicating arrival. When the ICD 12 is removed from the cargo bay, it again recognizes the GPS satellite signal, and transmits this information to the web services external application 60. The external database record is updated along with the color-coded button, the customer service representative recognizes this and changes the ICD 12 status. The service representative or an external application 18 delivers a message to the passenger indicating the item 2 has arrived.

It should be noted that the actual position of the ICD 12, as determined by the system 10 and ICD 12, is permitted to deviate within a range without generating a misrouting message or alarm. For instance, this may be calibrated according to airport or gate so that it is within a few yards or meters such that it can be determined that the ICD 12, though not immediately proximate a plane, is located within an area proximate to the plane to conclude that it has properly arrived at the plane for loading. As global position can be highly accurate (within centimeters), pinpointing an expected location would result in numerous false-positives for misrouting of the ICD 12.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A system for tracking a portable item, the system comprising:
    a communications device stowable with the item and having wireless communication, the communications device adapted to communicate with a geographic positioning system remotely located from the communications device to determine a present physical geographic location of the communications device, the communications device including a passive listening input device that includes a transmitter and a receiver for effecting the wireless communication, the passive listening input device adapted to disable the transmitter and maintain functionality of the receiver;
    an external application in wireless communication with the communications device, the application adapted to provide a predetermined expected physical geographic location for the communications device at a specified time; and
    an alert operably coupled to the communications device that is activated if, at the specified time, the present physical geographic location is not the same as the predetermined expected physical geographic location.

2. The system of claim 1 wherein the communications device utilizes global positioning system satellites.

3. The system of claim 1 further comprising an external database, wherein the communications device retrieves location coordinates and corresponding times for the communications device from the external database via one of the external applications.

4. The system of claim 1 further comprising an alert when the present physical geographic location of the communications device is outside of a calibrated range from the predetermined physical geographic location at the specified time.

5. The system of claim 4 wherein the communications device provides an alert to the external applications of misrouting of the communications device when the present physical geographic location is outside of a calibrated range from the predetermined physical geographic location at the specified time.

6. The system of claim 4 wherein the specified time corresponds to departure or arrival on a plane, and the physical geographic location is proximate a plane.

7. The system of claim 1 further including a call device, wherein the communications device is responsive to the call device by providing an alarm or identification response.

8. The system of claim 7 wherein the alarm is selected from illuminated lights, an auditory sound, or a communication response.

9. A device for tracking a checked item at an airport, the device comprising:
    a memory module;
    a communications module;
    an alert provided by the device;
    a processor module; and
    an input module, wherein:
        the communications module communicates with a geographic positioning system to receive geographic location information, the processor module interprets the geographic location information to determine an actual geographic position, the communications module communicates with an external application to receive an expected geographic position at a specified time, the device compares the actual geographic position with the expected geographic position, and the alert is automatically activated to personnel if the actual geographic position is not substantially the expected geographic position at the specified time; and
        the communications module includes a passive listening input device that includes a transmitter and a receiver for effecting the communication between the communications module and the external application, the passive listening input device adapted to disable the transmitter.

10. The device of claim 9 wherein the communications module transmits the actual geographic position to the external application.

11. The device of claim 9 wherein the device sends a misroute message to the external application when the actual geographic position is outside of a calibrated range from the expected geographic position.

12. A method of operating a system for tracking a portable item via a communications device provided with the portable item, the method comprising the steps of:
    routing the communications device and portable item;
    providing expected geographic location coordinates corresponding to at least one specified time;
    determining actual geographic location coordinates for the communications device corresponding to the specified time;
    automatically providing an alert by the communications device if the actual geographic location coordinates are not within a calibrated range of the expected geographic location coordinates at the specified time as determined by the communications device; and disabling a transmitter and maintaining functionality of a receiver provided within the communications device by a passive listening input device.

13. The method of claim 12 wherein the step of providing expected geographic location coordinates includes delivering the expected geographic location coordinates to the communications device.

14. The method of claim 12 wherein the step of determining actual geographic location coordinates is performed by the communications device.

15. The method of claim 12 further including the step of sharing the actual geographic location coordinates between the communications device and a remotely-located system.

16. The method of claim 12 further including sending a failure alert if any of the steps is not performed.

17. The method of claim 12 further including steps of:
the communications device determining if geographic location signals are sufficient to determine a geographic location are receivable; and
providing an alert if said signals are not sufficient to determine a geographic location.

18. A tracking system for tracking a portable item, the tracking system comprising:
a communications device securable with the item and having at least one-way wireless communication, the communications device including a passive listening input device that includes a transmitter and a receiver for effecting the wireless communication, the passive listening input device adapted to disable the transmitter;
a set of external applications including one or more external applications, the set of external applications remotely located from the communications device, the communications device and at least one of the external applications being able to communicate wirelessly in at least one direction;
an alert;
wherein the communications device at least receives communications from the geographic positioning system, the tracking system provides a predetermined expected physical geographic location for the communications device at a specified time, the tracking system determines an actual physical geographic location of the communications device, the communications device receives communications from the geographic positioning system including location information regarding the actual physical geographic location of the communications device, the communications device processes the location information to determine the actual physical geographic location, the communications device transmits the processed location information to at least one of the external applications, the communications device determines whether the actual physical geographic location is within a calibrated range of the predetermined expected physical geographic location at the specified time, and the alert being automatically activated to indicate the communications device failed to be within the calibrated range of the predetermined expected physical geographic location at the specified time.

19. A tracking system for tracking a portable item, the tracking system comprising:
a communications device securable with the item and having at least one-way wireless communication, the communications device adapted to communicate with a geographic positioning system remotely located from the communications device to determine a present physical geographic location of the communications device, the communications device including a passive listening input device that includes a transmitter and a receiver for effecting the wireless communication, the passive listening input device adapted to disable the transmitter;
a set of external applications including one or more external applications, the set of external applications remotely located from the communications device, the communications device and at least one of the external applications being able to communicate wirelessly in at least one direction;
wherein the communications device at least receives communications from the geographic positioning system, the tracking system provides a predetermined expected physical geographic location for the communications device at a specified time, the tracking system determines an actual physical geographic location of the communications device, the communications device receives communications from the geographic positioning system including location information regarding the actual physical geographic location of the communications device, the communications device processes the location information to determine the actual physical geographic location, the communications device receives the predetermined expected physical geographic location at a specified time information from one of the external applications, the communications device compares the actual physical geographic location with the predetermined expected physical geographic location at the specified time, and the communications device provides an alert if the actual physical location is not within a calibrated range of the predetermined expected physical geographic location at the specified time.

20. The tracking system of claim 19 wherein the alert includes a visual, audible, or radio-frequency communication.

21. The tracking system of claim 19 wherein the alert includes providing an alert to at least one of the external applications.

* * * * *